US012571160B2

(12) United States Patent
Ide

(10) Patent No.: US 12,571,160 B2
(45) Date of Patent: Mar. 10, 2026

(54) PAPER STOCK MODIFICATION DEVICE

(71) Applicant: TAIZEN CO., LTD., Fuji (JP)

(72) Inventor: Takefumi Ide, Fuji (JP)

(73) Assignee: TAIZEN CO., LTD., Fuji-City (JP)

(*) Notice: Subject to any disclaimer, the term of this patent is extended or adjusted under 35 U.S.C. 154(b) by 169 days.

(21) Appl. No.: 18/280,656

(22) PCT Filed: Apr. 20, 2021

(86) PCT No.: PCT/JP2021/015961
§ 371 (c)(1),
(2) Date: Sep. 6, 2023

(87) PCT Pub. No.: WO2022/201560
PCT Pub. Date: Sep. 29, 2022

(65) Prior Publication Data

US 2024/0173683 A1 May 30, 2024

(30) Foreign Application Priority Data

Mar. 22, 2021 (JP) ................................ 2021-047688

(51) Int. Cl.
*D21B 1/34* (2006.01)
*B01F 27/70* (2022.01)
(Continued)

(52) U.S. Cl.
CPC ................ *D21B 1/34* (2013.01); *B01F 27/70* (2022.01); *B01F 27/707* (2022.01);
(Continued)

(58) Field of Classification Search
CPC .... B01F 27/70; B01F 35/123; B01F 2101/47; B01F 27/2123; B01F 27/707; D21B 1/32; D21B 1/34; D21B 1/14; B02C 18/22
See application file for complete search history.

(56) References Cited

U.S. PATENT DOCUMENTS 4,225,427 A 9/1980 Schnell
2022/0243394 A1 8/2022 Ide

FOREIGN PATENT DOCUMENTS

CN 101092800 A 12/2007
CN 103132354 A 6/2013
(Continued)

OTHER PUBLICATIONS

Google Machine Translation JPH01-1122097U1, 1989. (Year: 1989).*
(Continued)

*Primary Examiner* — Anthony Calandra
(74) *Attorney, Agent, or Firm* — Juan Carlos A. Marquez; Marquez IP Law Office, PLLC

(57) ABSTRACT

A paper stock modification device is provided wherein accretions do not build up on the blades even when modifying paper feedstock comprising large amounts of hot melt, adhesive material, etc. and there is no risk of damage to the cylinder. Since a circular member is provided in a space at the other end, the paper feedstock accumulates in front of the end face of the circular member and is in a softened state with moisture removal being incomplete. Metal scraper parts protrude therein and the metal scraper parts are in close proximity to blades. Thus, even if paper feedstock comprising large amounts of hot melt, adhesive material, etc. adheres to the blades, the same is completely scraped off as a result of a scraping action of the plate surfaces of the metal scraper parts that is caused by the rotation of the blades.

4 Claims, 5 Drawing Sheets

(51) Int. Cl.

| | |
|---|---|
| ***B01F 27/707*** | (2022.01) |
| ***B01F 35/12*** | (2022.01) |
| ***B01F 101/47*** | (2022.01) |
| ***D21B 1/14*** | (2006.01) |
| ***D21B 1/32*** | (2006.01) |

(52) U.S. Cl.
CPC .............. *B01F 35/123* (2022.01); *D21B 1/14* (2013.01); *D21B 1/32* (2013.01); *B01F 2101/47* (2022.01)

(56) References Cited

FOREIGN PATENT DOCUMENTS

| | | | | | |
|---|---|---|---|---|---|
| CN | 107051355 | A | * | 8/2017 | ............ B01F 35/123 |
| JP | 264992 | A1 | | 11/1988 | |
| JP | 122097 | U1 | | 8/1989 | |
| JP | 3433919 | B2 | | 5/2003 | |
| WO | 2021009988 | A1 | | 1/2021 | |

OTHER PUBLICATIONS

PCT nternational Search Report, mailed Jul. 6, 2021, in counterpart PCT application PCT/JP20201015961, 2 pages in English.

* cited by examiner

PAPER STOCK MODIFICATION DEVICE

TECHNICAL FIELD

The present invention relates to a paper stock modification device for carrying out treatment for removing ink, a bond, and glue from paper feedstock such as wastepaper that includes hot melt, an adhesive, and the like.

BACKGROUND ART

An example of this type of paper stock modification device is shown in Patent Literature 1. This paper stock modification device is provided with a cylinder laterally, an input port through which paper feedstock such as wastepaper can be inputted is provided in an end portion on one side (first end side) of this cylinder in the axial direction, and an output port through which the paper feedstock of which the treatment has been completed can be discharged is provided in an end portion on the other side (second end side). The output port can be opened or closed by means of an adjustment damper.

In addition, a rotational shaft is provided so as to pass through the cylinder, and this rotational shaft is supported by bearings that are attached to the two end portions of the cylinder. The rotational shaft can be rotated by means of a drive motor. A conveyance screw is provided on approximately half of the rotational shaft on one side, and blades are provided on approximately the other half of the rotational shaft on the other side.

Paper feedstock such as wastepaper is put into the cylinder through the input port of this paper stock modification device so as to be conveyed to the other side of the cylinder by means of the conveyance screw, and thus, the paper feedstock is compressed and expanded repeatedly by means of the blades so that the temperature is increased, making the hot melt and the adhesive be in a state of being balled up, and then, the paper feedstock is discharged through the output port after the completion of the treatment thereof. In addition, the opening and closing of the output port is adjusted by means of the adjustment damper so that an appropriate treatment can be carried out on the inputted paper feedstock.

Hot melt, an adhesive, and the like can be efficiently removed from the thus-treated paper feedstock in the post-treatment using a slit screen.

CITATION LIST

Patent Literature

Patent Literature 1: Japan Patent No. 3433919

SUMMARY OF THE INVENTION

Technical Problem

In the above-described conventional paper stock modification device, the output port is provided on the second end side of the cylinder, which makes a space (hereinafter, referred to as space at the second end) between the end of the output port on the second end side and the end of the cylinder on the second end side. This is because it is necessary to provide the output port at the second end of the cylinder with a certain distance in between in order to form a flange through which bolts for attaching a bearing device in the second end portion of the cylinder or to secure the strength of the cylinder.

In the conventional paper stock modification device, this space at the second end ends up becoming a place where the paper feedstock from which the water content has been discharged stays. Therefore, in the case where paper feedstock includes a large amount of hot melt, an adhesive, or the like, the adhesive that has stayed in this place easily adheres, together with the paper feedstock, to the blades that are in the closest proximity to this space at the second end as accretion. When this accretion further builds up and grows, the accretion scratches the inner surface of the cylinder as the blades turn, and thus, there is a risk of the cylinder being damaged.

The present invention is made by reviewing the above-described problem with the prior art, and an object thereof is to provide a paper stock modification device wherein no accretion builds up on the blades, and thus, there is no risk of the cylinder being damaged.

Solution to Problem

The present invention is made in order to solve the above described problem, and thus, the invention according to at least claim 1 relates to a paper stock modification device that includes: a cylinder that is provided laterally so that paper feedstock can be fed in the direction from one side of the axis to the other side of the axis; an input port that is provided in an end portion on one side (first end side) of the cylinder through which paper feedstock can be inputted; an output port that is provided in an end portion on the other side (second end side) of the cylinder and through which the treated paper feedstock can be outputted; a rotational shaft that is provided so as to pass through a center portion within the cylinder, and can be driven so as to rotate; a feeding screw that is provided on the first end side of the rotational shaft; a plurality of blades that are provided on the second end side of the rotational shaft, and are arranged so as to have a gap between each other in the direction of the axis of the rotational shaft; blocking fittings that are provided so as to protrude towards the center of the cylinder and between the blades; a pressure maintaining means for maintaining a predetermined pressure within the cylinder; and a porous part for closing an opening created on the lower side of the cylinder, and is characterized by further including: a circular member that is provided so as to fill in, on the second end side, a space at the second end that ranges from the end of the output port on the second end side inside the cylinder to the end portion of the cylinder on the second end side, and through which the rotational shaft can be placed so as to be rotatable; and a metal scraper that is provided so as to protrude from the cylinder between an end surface of the circular member on the first end side and a blade that is in the closest proximity to the space at the second end.

The invention further relates to the paper stock modification device, and is characterized in that the end surface of the circular member on the first end side in the space at the second end is in a vertical plane, and the metal scraper has a vertical end surface which faces the vertical end surface of the circular member in close proximity.

The invention further relates to the paper stock modification device, and is characterized in that a blade that is in the closest proximity to the space at the second end extends towards the second end side beyond the end of the output port on the second end side.

The invention further relates to the paper stock modification device, and is characterized in that one or more metal scrapers that are the same as the metal scraper are provided so as to protrude in the peripheral directions at intervals.

The invention further relates to the paper stock modification device, and is characterized in that the metal scraper is formed so as to have the same shape as the blocking fittings.

Advantageous Effects of the Invention

In the paper stock modification device according to the present invention, accretion can be prevented from building up on the blade that is in the closest proximity to the space at the second end even when paper feedstock that includes a large amount of hot melt, an adhesive, and the like is treated. Accordingly, there is no risk of the cylinder being damaged by being scratched by the blades.

DESCRIPTION OF EMBODIMENTS

Figure 1:
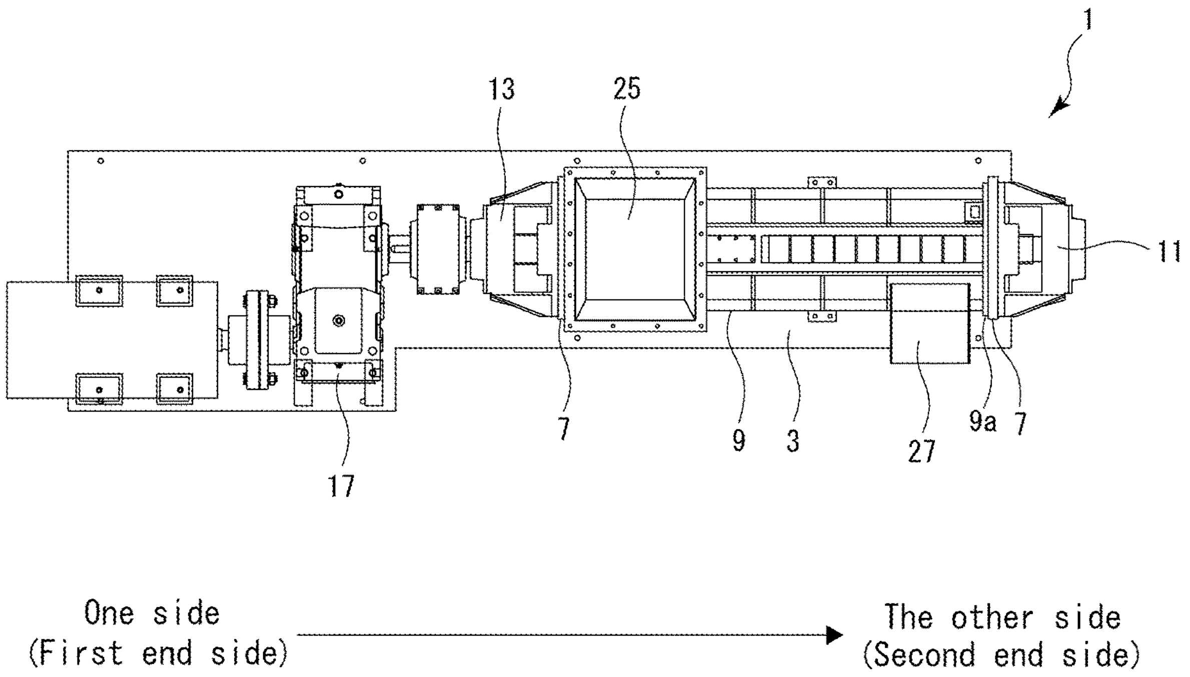
FIG. 1 is a plan diagram showing the paper stock modification device according to one embodiment of the present invention as viewed from the top.
Figure 2:
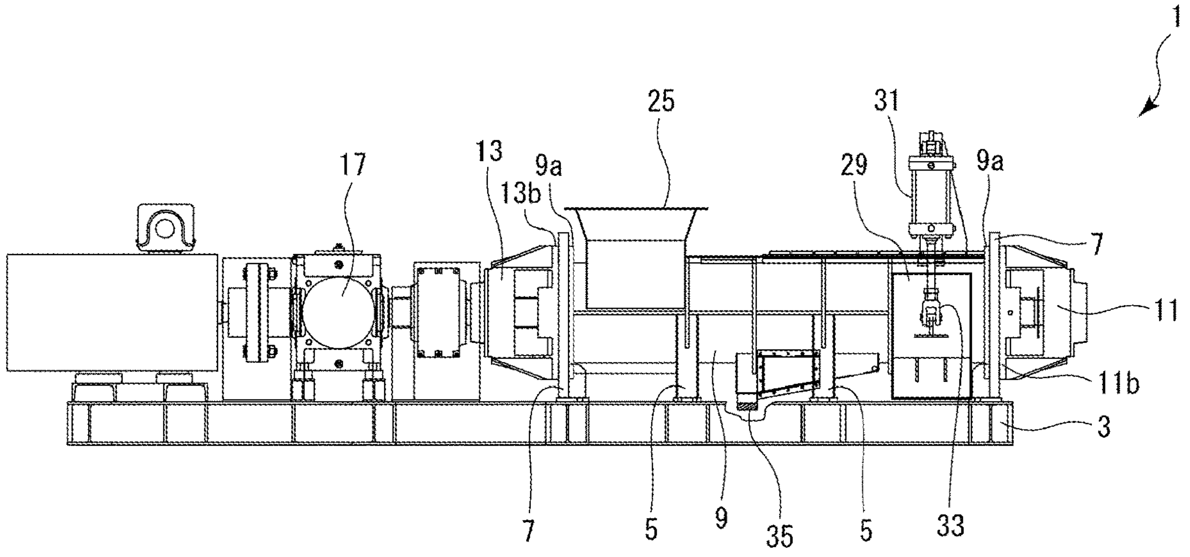
FIG. 2 is a side diagram showing the paper stock modification device in FIG. 1.

The paper stock modification device 1 for paper feedstock according to an embodiment of the present invention is described in reference to FIGS. 1 through 5.

3 denotes a support base, and the support base 3 is provided with brackets 5 and 7. A circular hole 7a is created in the bracket 7.

9 denotes a cylinder, and a flange 9a is formed in either end portion of this cylinder 9. The cylinder 9 is supported by the bracket 5 in its middle portion, and the two end portions are supported by the bracket 7, and thus, the cylinder 9 is laterally provided on top of the support base 3. The flange 9a of the cylinder 9 makes contact with the flange 7b of the bracket 7.

As indicated by the arrow in FIG. 1, paper feedstock such as wastepaper is conveyed through the cylinder 9 from one side (first end side) to the other side (second end side).

Figure 3:
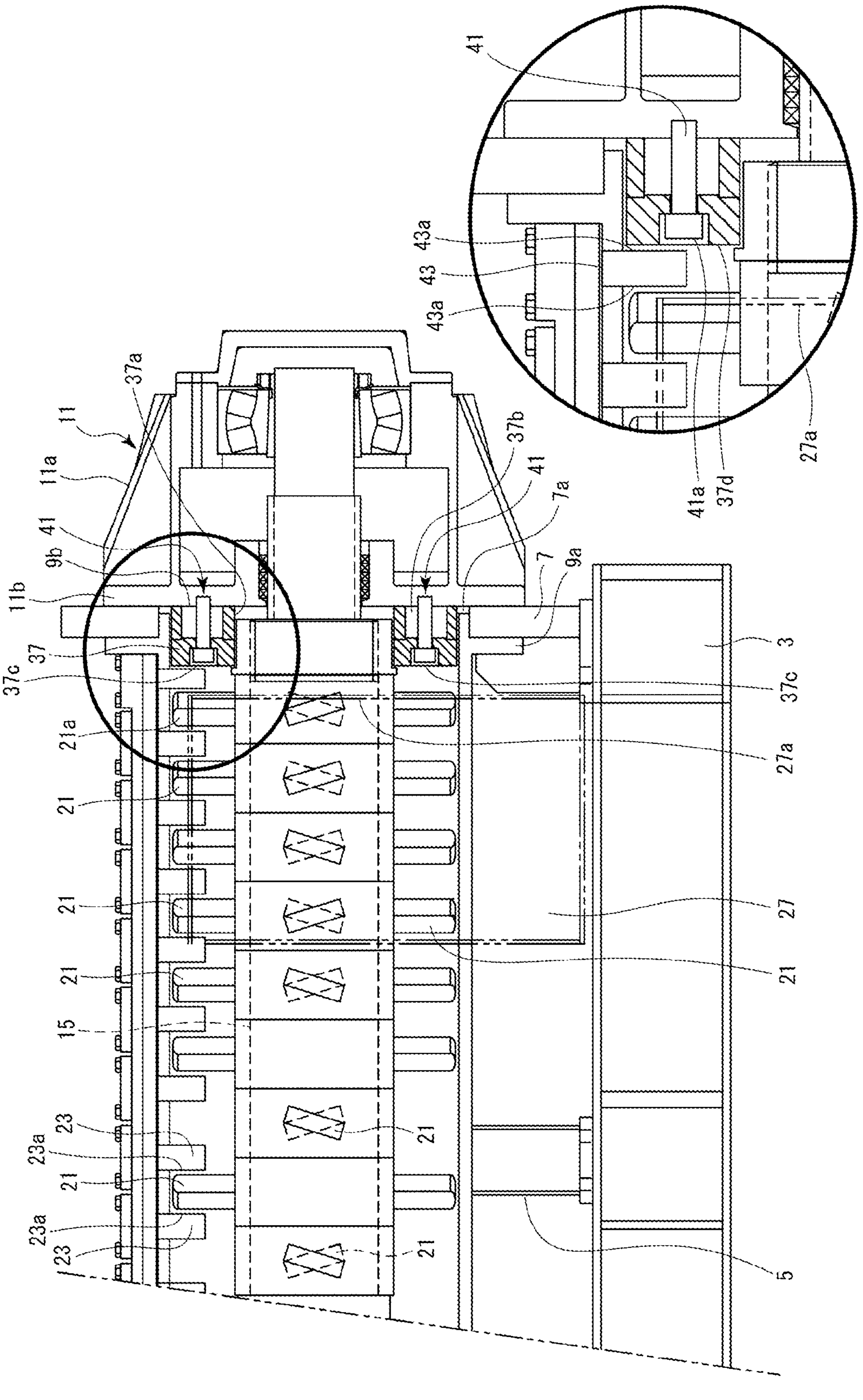
FIG. 3 is a cross-sectional diagram showing a portion in FIG. 2.

11 denotes a bearing device, and the bearing device 11 is attached to the second end side of the cylinder 9 so as to close the opening of the cylinder 9 on the second end side as shown in FIG. 3 in detail. A flange 11b is formed on the case 11a of the bearing device 11 in such a manner that the flange 11b makes contact with the bracket 7. Thus, the flange 11b of the bearing device 11, the flange 9a of the cylinder 9, and the flange 7b of the bracket 7 are connected to each other by means of bolts. In the same manner, the opening of the cylinder 9 on the first end side is closed by the bearing device 13.

Four female screws (not shown) are created in the flange 11b of the bearing device 11. No female screws are created in the flange 13b of the bearing device 13.

A rotational shaft 15 passes through the center portion of the cylinder 9, and the two end portions of the shaft are supported by the bearing devices 11 and 13 respectively so as to be rotatable. In addition, one end portion of the rotational shaft 15 is connected to a drive motor 17.

A feeding screw, not shown, is provided on the rotational shaft 15 on the first end side. In addition, a plurality of blades 21, 21, . . . are provided on the second end side of the rotational shaft 15 in such a manner that the blades 21 are arranged with intervals in between in the direction of the axis of the rotational shaft 15. Blades 21 are provided so as to be inclined, and thus, the directions thereof cross each other relative to the forward direction and the backward direction in terms of the feeding direction. In addition, the blades 21 are arranged so as to shift by 90° in the direction of the periphery. Accordingly, there are places where two or four blades 21 are arranged in the direction of the periphery as viewed in the cross-section that is perpendicular to the direction of the axis.

23 denotes blocking fittings. The cylinder 9 has a structure with a plurality of layers, and the blocking fittings 23 are provided so as to protrude from the inner cylinder 9d that forms the inner surface of the cylinder 9 towards the center of the axis. The blocking fittings protrude from the highest level in the inside of the cylinder as viewed in the cross-section, and thus, extend from the top to the bottom when they are positioned to be vertical. Each of the plurality of blocking fittings 23, 23, . . . is arranged so as to protrude between each pair of adjacent blades 21 and 21. The blocking fittings 23 are in rectangular plate form, and each plate surface 23a that faces the blade 21 is in a vertical plane.

A cylindrical input port 25 is provided so as to communicate with the inside of the cylinder 9 through the upper side of the cylinder 9 on the first end side in the direction of the axis. In addition, an output port 27 is provided in the cylinder on the second end side in the direction of the axis so as to communicate with the inside of the cylinder 9 through the front side. The output port 27 can be opened or closed with a lid body 29. An adjustment damper 33 that is connected to an air cylinder 31 is linked to the lid body 29. Accordingly, the inside of the cylinder is maintained at a predetermined pressure.

In addition, the lower side of the cylinder 9 is opened in the middle in the direction of the axis, and this opening is closed with a punched metal, not shown, through which water can pass. In addition, the portion that surrounds the opening is connected to a drainage outlet 35.

37 denotes a circular member, and the circular member 37 has a certain thickness with a round hole 37a at the center. The size of the diameter of the round hole 37a is set so that the rotational shaft 15 is allowed to be inserted in such a manner as to be rotatable. An annular trench 37b is created on the end surface 37d of the circular member 37 on the second end side. In addition, four holes 37c through which a bolt can be inserted are created in the circular member 37 in such a manner that the bolt insertion holes 37c communicate with the end surface 37d and the trench 37b that are exposed on the first end side of the circular member 37. The end surface 37d is in a vertical plane.

A space 39 at the second end is provided inside the cylinder 9 between the end 27a of the output port 27 on the second end side and the end portion 9b of the cylinder 9 on the second end side.

The circular member 37 is provided in the space 39 at the second end so as to fill in the gap in the space 39 at the second end on the second end side. The rotational shaft 15 passes through the round hole 37a of the circular member 37. In addition, bolts 41 are inserted through the bolt insertion holes 37c so as to be screwed in the female screws

11*c* that are created in the flange 11*b* of the bearing device 11. The end surface 37*d* is in a plane, and the upper surface 41*a* of the heads of the bolts 41 is in approximately the same plane as the end surface 37*d.*

Figure 4:
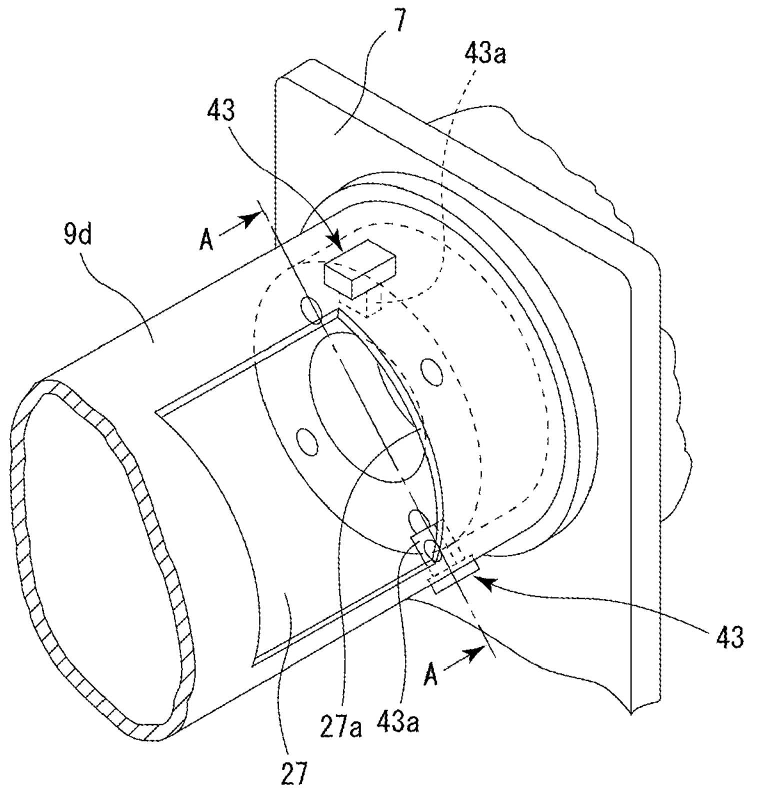
FIG. 4 is a perspective diagram showing the second end portion of the paper stock modification device in FIG. 1 from which some parts have been removed.
Figure 5:
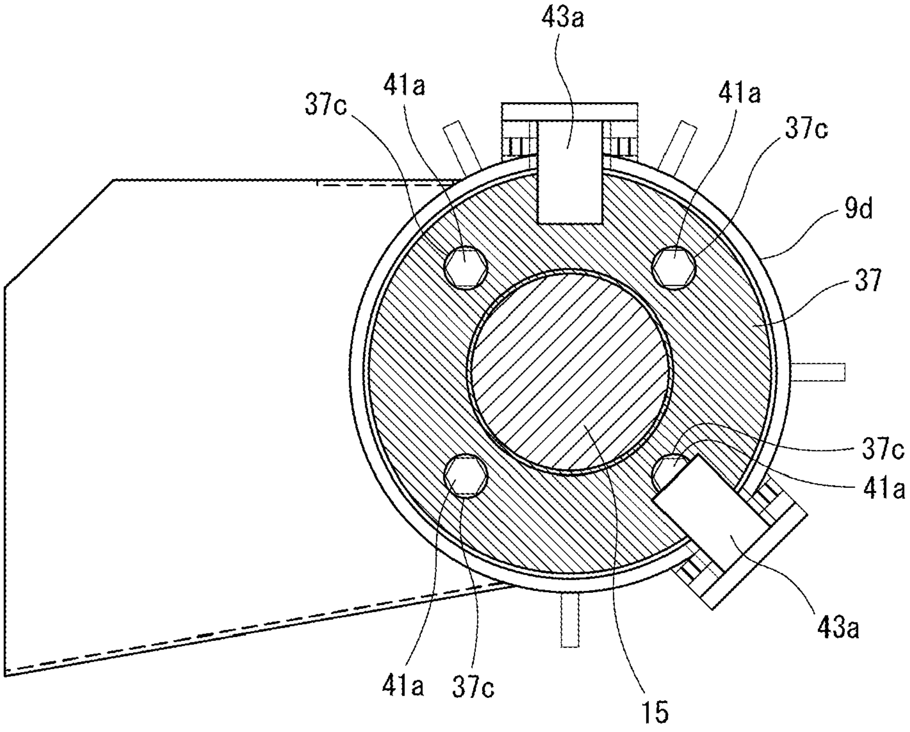
FIG. 5 is a cross-sectional diagram along A-A in FIG. 4.

As shown in FIGS. 4 and 5, two metal scrapers 43 and 43 are provided on the first end side relative to the circular member 37 in the space 39 at the second end. These metal scrapers 43 are formed to have the same shape as the blocking fittings 23 and protrude from the inner surface of the cylinder 9 towards the center of the axis. One metal scraper 43 protrudes from the highest level in the inside of the cylinder as viewed in the cross-section, and thus, extends from the top to the bottom when it is in a vertical position. The other metal scraper 43 extends in a diagonal direction. The two metal scrapers 43 and 43 are arranged so as to shift by 135° in the direction of the periphery. Here, FIG. 3 only shows the metal scraper 43 that extends from the top to the bottom from among the metal scrapers 43 and 43 for the purpose of convenience of the drawing of the figure.

These metal scrapers 43 and 43 are in close proximity to the blades 21*a*, 21*a*, . . . that are arranged on the second end side in the direction of the axis from among the blades 21, 21, . . . so as to be arranged between the blades 21*a*, 21*a*, . . . and the end surface 37*d* of the circular member 37.

The plate surfaces 43*a*, 43*a* of the metal scrapers 43 face the end surface 37*d* with a small gap in between, and thus, are in close proximity to the end surface 37*d* on the second end side, and face the blades 21*a*, 21*a*, . . . with a small gap in between, and thus, are in close proximity to the blades 21*a*, 21*a*, . . . on the first end side.

The blades 21*a*, 21*a*, . . . extend to the second end side beyond the end 27*a* of the output port 27 on the second end side, and thus, partially protrude into the space 39 at the second end.

The paper stock modification device 1 is formed as described above.

The operation of the paper stock modification device 1 is described below.

Paper feedstock that includes a large amount of hot melt, an adhesive and the like is put into the cylinder 9 through the input port 25.

The paper feedstock is fed towards the output port 27 by means of the feeding screw inside the cylinder 9. When the paper feedstock reaches the second end side of the cylinder 9, the paper feedstock is in an untwisted state between the feeding forces in the forward and backward directions due to the blades 21 that rotate together with the rotational shaft 15. In addition, blocking fittings 23 that are fixed between the blades 21 are pushed into the paper feedstock sequentially, and thus, the paper feedstock is prevented from rotating together with the blades 21.

As described above, the paper feedstock is placed in an untwisted state, and thus, compression and expansion are repeated. As a result, the temperature of the paper feedstock increases, and the hot melt and the adhesive are in a state of being balled up, whereas the paper feedstock of which the treatment has been completed is discharged through the output port 27. In addition, the opening and closing of the output port 27 is adjusted by the adjustment damper 33 so that the treatment that is appropriate for the inputted paper feedstock can be carried out. Here, water is discharged through the drainage outlet 35.

The paper stock modification devise 1 has the circular member 37 being provided in the space 39 at the second end, and therefore, paper feed stock stays in front of the end surface 37*d* of the circular member 37 and is in a softened state with the water content being removed incompletely. The metal scrapers 43, 43 protrude thereinto in such a manner that the metal scrapers 43 and 43 are in close proximity to the blades 21*a*, 21*a*, . . . . Accordingly, the paper feedstock that includes a large amount of hot melt, an adhesive, and the like and adheres to the blades 21*a*, 21*a*, . . . , can be completely scraped off as a result of the scraping action that takes place on the plate surfaces 43*a*, 43*a* of the metal scrapers 43 due to the rotation of the blades 21*a*, 21*a*, . . . .

In addition, the plate surfaces 43*a* of the metal scrapers 43 are in close proximity to the end surface 37*d*, and thus, a large chunk of hot melt or the adhesive does not come into the small gap. When a large chunk of hot melt or the adhesive comes into the gap, accretion of paper feedstock starts therefrom and further building-up and the hardening of the accretion progress, which causes a risk of making it difficult to scrape off the accretion with the metal scrapers 43; however, there is no such risk in this paper stock modification devise.

Furthermore, blades 21*a*, 21*a* . . . extend toward the second end side beyond the end 27*a* of the output port 27 on the second end side, and therefore, the amount of paper feedstock that stays in front of the end surface 37*d* of the circular member 37 can be decreased.

Though an embodiment of the present invention is described in detail in the above, the concrete configuration is not limited to this embodiment, and modifications in the design are included in the invention as long as the gist of the present invention is not deviated from.

For example, two metal scrapers 43, 43 are provided in the space 39 at the second end in the above-described embodiment; however, the present invention is not limited to this, and three or more metal scrapers may be provided.

REFERENCE SIGNS LIST

1 . . . Paper stock modification device
3 . . . Support base
5, 7 . . . Bracket
7*a* . . . Circular hole in the bracket
7*b* . . . Flange of the bracket
9 . . . Cylinder
9*a* . . . Flange of the cylinder
9*b* . . . End portion of the cylinder on the second end side
9*d* . . . Inner cylinder
11, 13 . . . Bearing device
11*a* . . . Case of the bearing device
11*b* . . . Flange of the bearing device
11*c* . . . Female screw in the flange of the bearing device
13*b* . . . Flange of the bearing device
15 . . . Rotational shaft
17 . . . Drive motor
21 . . . Blade
23 . . . Blocking fitting
23*a* . . . Plate surface
25 . . . Input port
27 . . . Output port
27*a* . . . End of the output port
29 . . . Lid body
31 . . . Air cylinder
33 . . . Adjustment damper
35 . . . Drainage outlet
37 . . . Circular member
37*a* . . . Round hole of the circular member
37*b* . . . Trench in the circular member
37*c* . . . Hole in the circular member through which bolts can be inserted

37*d* . . . End surface of the circular member
39 . . . Space at the second end
41 . . . Bolt
41*a* . . . Upper surface of the head of the bolt
43 . . . Metal scraper
43*a* . . . Plate surface

The invention claimed is:

1. A paper stock modification device, comprising:

a cylinder that is provided laterally so that paper feedstock can be fed in the direction from one side of the axis to the other side of the axis, the cylinder being configured to maintain a predetermined pressure therein;

an input port that is provided in an end portion on a first end side of the cylinder through which paper feedstock can be inputted;

an output port that is provided in an end portion on a second end side of the cylinder and through which the treated paper feedstock can be outputted;

a rotational shaft that is provided so as to pass through a center portion within the cylinder, and can be driven so as to rotate;

a feeding screw that is provided on the first end side of the rotational shaft;

a plurality of blades that are provided on the second end side of the rotational shaft, and are arranged so as to have a gap between each other in the direction of the axis of the rotational shaft;

blocking fittings that are provided so as to protrude towards the center of the cylinder and between the blades; and a porous part for closing an opening created on the lower side of the cylinder, wherein the porous part further comprises:

a circular member that is provided so as to fill in, on the second end side, a space at the second end that ranges from the end of the output port on the second end side inside the cylinder to the end portion of the cylinder on the second end side, and through which the rotational shaft can be placed so as to be rotatable, and a metal scraper that is provided so as to protrude from the cylinder between an end surface of the circular member on the second end side and a blade that is in the closest proximity to the space at the second end, wherein a blade that is in the closest proximity to the space at the second end extends towards the second end side beyond the end of the output port on the second end side.

2. The paper stock modification device according to claim 1, wherein the end surface of the circular member on the first end side in the space at the second end is in a vertical plane, and the metal scraper has a vertical end surface which faces the vertical end surface of the circular member in close proximity.

3. The paper stock modification device according to claim 1, wherein one or more metal scrapers that are the same as the metal scraper are provided so as to protrude in the peripheral directions at intervals.

4. The paper stock modification device according to claim 1, wherein the metal scraper is formed so as to have the same shape as the blocking fittings.

* * * * *